United States Patent [19]

Richeson

[11] Patent Number: 4,945,870
[45] Date of Patent: Aug. 7, 1990

[54] VEHICLE MANAGEMENT COMPUTER

[75] Inventor: William E. Richeson, Fort Wayne, Ind.

[73] Assignee: Magnavox Government and Industrial Electronics Company, Fort Wayne, Ind.

[21] Appl. No.: 226,418

[22] Filed: Jul. 29, 1988

[51] Int. Cl.$^5$ .................. F01L 9/04; F02B 75/02; F02M 25/06; F02N 17/08

[52] U.S. Cl. .................. 123/90.11; 123/64; 123/179 H; 123/568

[58] Field of Search .................. 123/90.11, 90.15, 64, 123/179 H, 179 B, 568

[56] References Cited

U.S. PATENT DOCUMENTS

| | | | |
|---|---|---|---|
| 4,392,459 | 7/1983 | Chareire | 123/90.11 X |
| 4,593,658 | 6/1986 | Moloney | 123/90.11 |
| 4,614,170 | 9/1986 | Pischinger et al. | 123/90.11 |
| 4,641,613 | 2/1987 | Delesalle | 123/90.11 X |
| 4,700,684 | 10/1987 | Pischinger et al. | 123/90.11 X |

*Primary Examiner*—Willis R. Wolfe
*Attorney, Agent, or Firm*—Roger M. Rickert; Thomas A. Briody; Richard T. Seeger

[57] ABSTRACT

A method of and apparatus for starting and accelerating a vehicle through a range of vehicle speeds during which the vehicle's internal combustion engine is operated in a plurality of different operating modes is disclosed. The engine may first be cranked in a compressionless mode preparatory to starting and then run in a second mode at a relatively low speed for a warm-up interval as a six-stroke cycle engine where each engine cylinder cycle includes an essentially adiabatic compression and expansion. The system may then convert to a third mode of operation as a four-stroke cycle engine during normal engine operation. Different operating modes are available during this normal engine operation. Under high demand conditions, the engine may be run as a conventional inefficient but effective throttled engine or converted to operate in a fourth mode as a two-stroke cycle engine. The system responds to second engine conditions to modify the parameters in a memory table and controls the vehicle in accordance with the parameters stored in the table. Both short term modification to accommodate dynamic changes in the sensed engine conditions and long term modification to compensate for relatively slow changes in the engine and the management system are made to the information in a random access memory. The modifications may be on an overall engine basis or an individual cylinder basis.

13 Claims, 4 Drawing Sheets

VEHICLE MANAGEMENT COMPUTER

The present invention relates generally to computer management of the overall operation of a vehicle and more particularly to a system for controlling the operating parameters of the vehicle's spark ignited internal combustion engine and in compression ignition engines including ignition timing, fuel, air intake, and intake and exhaust valve opening and closing, all interdependently controlled to achieve optimum overall vehicle performance.

Internal combustion engine valves are almost universally of a poppet type which are spring loaded toward a valve-closed position and opened against that spring bias by a cam on a rotating cam shaft with the cam shaft being synchronized with the engine crankshaft to achieve opening and closing at fixed preferred times in the engine cycle. This fixed timing is a compromise between the valve timing best suited for high engine speed and the timing best suited to lower speeds or engine idling speed.

The prior art has recognized numerous advantages which might be achieved by replacing such cam actuated valve arrangements with other types of valve opening mechanism which could be controlled in their opening and closing as a function of engine speed as well as engine crankshaft angular position or other engine parameters. For example, U.S. Pat. No. 4,009,695 discloses hydraulically actuated valves in turn controlled by spool valves which are themselves controlled by a dashboard computer which monitors a number of engine operating parameters. This patent references many advantages which could be achieved by such independent valve control, but is not, due to its relatively slow acting hydraulic nature, capable of achieving these advantages. The patented arrangement attempts to control the valves on a real time basis so that the overall system is one with feedback and subject to the associated oscillatory behavior.

In U.S. Pat. Nos. 4,736,724 and 4,730,594 a number of engine performance indicators are monitored for the purpose of controlling the fuel-air mixture supplied to the engine. In U.S. Pat. No. 4,730,590 a number of engine performance indicators are monitored and a look-up table is employed for the purpose of controlling the fuel-air mixture supplied to the engine. In U.S. Pat. No. 4,732,126 a number of engine performance indicators are monitored for the purpose of controlling the width of a pulse supplied to fuel injectors thereby determining the fuel-air mixture supplied to the engine From the forgoing, it is apparent that fuel and ignition are relatively well managed on the present day automotive engine, however, the opening and closing of the intake and exhaust valves are not. The design of present conventional cam operated engine valves is the result of an ensemble of trade-offs. The various approaches of operating the valve gear with different types of cam mechanisms, that allow some control of the valves, leave much to desire in engine performance improvement because of the limited performance in the area of controlling the valve position versus time history and the resulting throttling of the valve port due to that history. Because of these facts, the volumetric efficiency is peaked in a narrow region of the required engine operating envelope. The result is that the fixed cam engines suffer when starting due to poor volumetric efficiency, do not idle smoothly at fuel conserving low engine speeds due to the intake valve closing somewhat after bottom dead center, do not idle without enriched combustion mixtures because of the reverse flow of exhaust to the intake manifold due to intake-exhaust valve overlap, do not idle well enough to allow using less than the full complement of cylinders, and provide less torque than is possible throughout most of the engine's operation range due in a large measure to improper valve timing. The engines run best at the unique point where the cam gives its best volumetric efficiency using mass flow effects that are less than what is possible due to the throttling effects of slowly opening and closing valves and hence the mass flow effects are, in themselves, largely uncontrolled. Additionally, at the high RPM range, these engines suffer from reduced performance and valve gear jeopardy due to high valve seating velocities and approaching valve float. Because of the fact that the valve opening and closing rates vary directly with engine RPM, the valve gear springs operate in a region where they put the safe long life operation of the system in jeopardy due to their being in a transition between being a lumped parameter and a distributed parameter element.

In the present fixed cam operated valve engines, the brake specific fuel consumption curve drops to a minimum as the air to fuel ratio goes from the best power point through stoichiometric to the best efficiency point. It then starts rising and the engine performance drops off and becomes unstable at the "lean burn limit." This rise and instability are primarily caused by the decreased burning rate, incomplete burning, and variability, and ultimately lack of, appropriate ignition for flame propagation throughout the volume of interest. The present cam operated valves require valve overlap in order to attain high volumetric efficiency. This valve overlap causes exhaust gas dilution of the charge at low engine RPM. The dilution of the charge by exhaust gas transfer, in turn, reduces the lean burn limit.

The decreased over-all burning propensity of lean burns causes the pressure versus crank shaft angle to rise more slowly and, with the effects of required turbulence for less burning time, with greater variance, peaking later and it may fall to such a low value during the expansion stroke that the burning may be quenched or, if not quenched, vented to the exhaust while still burning. These problems can be somewhat alleviated by operating the engine at a lower RPM; however, at lower RPM the turbulence of the combusting gasses is lower causing a reduction in the burning rate, hence, lower RPM assists the situation only to a limited extent. Another choice is to advance the ignition point thereby moving the ignition and burning process back relative to the crank angle. This also assists the situation; however, advancing the ignition point causes the ignition point to occur when the peak pressure, temperature and turbulence are less and less optimum for ignition to take place causing longer ignition delays with increased probability of flame quenching taking place, in turn causing variable ignition timing, misfires and generally increased variance of the pressure as a function of time in the combustion chamber. These problems limit the extent to which the brake specific fuel consumption will fall at higher air to fuel ratios. If these problems were solved, the brake specific fuel consumption and the emission would fall until the air to fuel ratio reached such high values that entropy would grow to such a level where the thermal efficiency would become the dominant limiting factor.

The ignition of the fuel-air charge can be effected by controlling the turbulence, temperature and pressure at the time of ignition along with an ignition source that can establish and maintain an ignition arc under these conditions. Highly turbulent conditions of the charge may blow out an ignition arc. When an induction ignition source is used, it must have sufficient potential to break down the spark plug gap and sufficient energy to reestablish that breakdown potential if the arc is blown out. The arc may need to be reestablished a number of times during the ignition period. As the gasses of the charge pass through the ignition gap, successful ignition of the overall charge takes place through the ignition of contiguous opportunities until there is a critical yield of combustion energy where massive propagation of the flame can be initiated. When these ignition source requirements are met, the high turbulent charge can greatly assist in increasing the probability of a successful, fast and more complete charge burn.

Control of the volumetric charging, swirl, retained heat, variable compression-expansion ratio, and appropriate control of ignition timing working in conjunction with the engine RPM and controlled fuel-air mixture and the cylinder pressure versus time pattern peaking and shape can greatly extend the lean burn limit and the usefulness of lean burn. As previously mentioned, in the present day cam operated valved engines, the fuel and ignition time are relatively well controlled; however, with all of the special advantages that the computer control of the engine valves makes possible, special improvements are needed in fuel-air and ignition management to fully realize the overall synergistic effect.

In copending application Ser. No. 021,195 entitled ELECTROMAGNETIC VALVE ACTUATOR, filed Mar. 3, 1987 in the name of William E. Richeson and assigned to the assignee of the present application, now U.S. Pat. No. 4,794,890, there is disclosed a valve actuator which has permanent magnet latching at the open and closed positions. Electromagnetic repulsion may be employed to cause the valve to move from one position to the other. Several damping and energy recovery schemes are also included.

In copending application Ser. No. 07/153,257, entitled PNEUMATIC ELECTRONIC VALVE ACTUATOR, filed Feb. 8, 1988 in the names of William E. Richeson and Frederick L. Erickson and assigned to the assignee of the present application, now U.S. Pat. No. 4,878,464, there is disclosed a somewhat similar valve actuating device which employs a release type mechanism rather than a repulsion scheme as in the previously identified copending application. The disclosed device in this application is a truly pneumatically powered valve with high pressure air supply and control valving to use the air for both damping and as the primary motive force. This copending application also discloses different operating modes including delayed intake valve closure and a six stroke cycle mode of operation.

In copending application Ser. No. 07/153,155 filed Feb. 8, 1988 in the names of William E. Richeson and Frederick L. Erickson, assigned to the assignee of the present application and entitled PNEUMATICALLY POWERED VALVE ACTUATOR, now U.S. Pat. No. 4,899,700, there is disclosed a valve actuating device generally similar in overall operation to the present invention. One feature of this application is that control valves and latching plates have been separated from the primary working piston to provide both lower latching forces and reduced mass resulting in faster operating speeds.

The presently copending applications Ser. No. 209,279 entitled PNEUMATIC ACTUATOR WITH PERMANENT MAGNET CONTROL VALVE LATCHING and Ser. No. 209,273 entitled PNEUMATIC ACTUATOR WITH SOLENOID OPERATED CONTROL VALVES both filed in the names of William E. Richeson and Frederick L. Erickson on Jun. 20, 1988 and assigned to the assignee of the present invention address, now U.S. Pat. No. 4,873,948, among other things, improvements in operating efficiency over the above noted devices.

Other related applications all assigned to the assignee of the present invention and filed in the name of William E. Richeson on Feb. 8, 1988 are Ser. No. 07/153,262 entitled POTENTIAL-MAGNETIC ENERGY DRIVEN VALVE MECHANISM, now U.S. Pat. No. 4,883,025, where energy is stored from one valve motion to power the next, and Ser. No. 07/153,154 entitled REPULSION ACTUATED POTENTIAL ENERGY DRIVEN VALVE MECHANISM, now U.S. Pat. No. 4,831,973 wherein a spring (or pneumatic equivalent) functions both as a damping device and as an energy storage device ready to supply part of the accelerating force to aid the next transition from one position to the other.

U.S. Pat. Nos. 4,109,630 and 4,373,486 assigned to the assignee of the present invention disclose improved and easily controlled breakerless ignition systems suitable for utilization in conjunction with the present invention. The entire disclosures of all of these copending applications and the aforementioned issued patents are specifically incorporated herein by reference.

The availability of fast acting and easily controlled valve actuating mechanisms such as those disclosed in the abovementioned copending applications makes possible a more complete and efficient overall vehicle operation management than was heretofor possible.

Among the several objects of the present invention may be noted the provision of an operator controlled vehicle drive train which is effective to maximize the operating economy of a vehicle using a spark ignited internal combustion engine, to maximize the performance and the general transient and steady state vehicle drivability, and to minimize harmful engine emissions without the use of catalytic converters and to optimally affect economy and performance; the provision of a more comprehensive computer control of vehicle operating parameters; the provision of a vehicle management system which takes full advantage of fast acting and highly controllable intake and exhaust valve mechanisms; the provision of a vehicle management computer which controls air-fuel, ignition and valving of an engine using a stored steady state table or map of engine information, currently modifies that information according to dynamic vehicle behavior, and optimizes that information on a long term basis in accordance with average long term vehicle behavior; the provision of vehicle control which allows the vehicle engine to be operated in each of several different modes; the provision of a vehicle management computer according to the previous object which may operate on an individual cylinder basis; and the provision of a vehicle control in accordance with the previous object which includes two-stroke cycle and six-stroke cycle modes. These as well as other objects and advantageous features of the present invention will be in part apparent and in part pointed out hereinafter.

In general, a vehicle management system has an arrangement for sensing a plurality of current, vehicle performance indicators, environmental conditions, and driver input, and a computing system which is responsive to the sensed input information to determine a plurality of vehicle operating parameters. The computing system includes a microprocessor, and a read only memory including a look-up table of optimum engine operating parameters under a wide variety of engine performance conditions. Controls are actuated by the computing system for controlling the vehicle in accordance with the determined parameters.

Also in general and in one form of the invention, an electronically controlled valve actuating mechanism and an associated intake valve on a reciprocating piston four stroke cycle internal combustion engine are controlled to operate selectively in a first mode at lower engine speeds, a second mode at higher engine speeds, and a third mode at near maximum engine speeds. The first mode includes increasing the portion of the cycle during which the intake valve is open as the engine speed increases, the second mode includes decreasing the portion of the cycle during which the intake valve is open as the engine speed increases, and the third mode includes opening and closing the intake valve in synchronism with engine speed to operate the engine as a conventional throttled engine. The engine may also be operated in a two-stroke cycle mode under high demand conditions and a lean burn mode under low demand conditions.

Still further in general, the present invention allows the conversion of at least one and perhaps all of the cylinders of the engine to a lean burn mode of operation only during periods of low engine demand. The lean burn mode includes the steps of closing an exhaust valve of the converted cylinder before the piston of that cylinder reaches a top dead center position to retain exhaust gas in that cylinder, and thereafter opening an intake valve of the converted cylinder to admit fuel and air to be mixed with the retained exhaust gas, and subsequently compressed and ignited to obtain a power stroke from the piston of the converted cylinder.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, the vehicle management system is seen to sense a plurality of current vehicle performance indicators and environmental conditions such as individual engine cylinder peak pressure 43, air mass flow 45 into the engine, ambient air temperature 47, ambient air pressure 49, ambient air relative humidity 51, engine intake manifold pressure 53, fuel temperature 55, vehicle speed 57, exhaust gas temperature 59, engine revolutions per minute 61, engine coolant temperature 63, and engine crank shaft angle 65. Auxilliary power requirements such as air conditioner demand may be included as inputs. The system also senses a number of driver inputs such as the degree 41 to which an accelerator pedal is depressed, the degree 67 to which a brake pedal is depressed, the octane rating of the particular fuel being used as well as its stoichiometric point or other indication of the energy content of the particular fuel 69, and a manual override 71 of the management system. In response to this information, a plurality of vehicle performance determining operating parameters such as engine ignition timing 37, the duration and timing of opening and closing of engine intake and exhaust valves 91, and the supply of fuel 93 and air 95 to the engine are controlled in accordance with the environmental, performance and driver inputs. Fuel 93 and air 95 are shown separately in FIG. 1 to emphasize the fact that the present invention, while described in conjunction with a conventional spark ignited internal combustion engine, is applicable to other engines such as Diesel engines. The supercharger control 92 may enable an exhaust gas driven supercharger of enhanced low speed effectiveness as will be described later. A microprocessor, and a read only memory including a look-up table of optimum engine operating parameters under a wide variety of engine performance conditions are employed in the control process.

Figure 1:
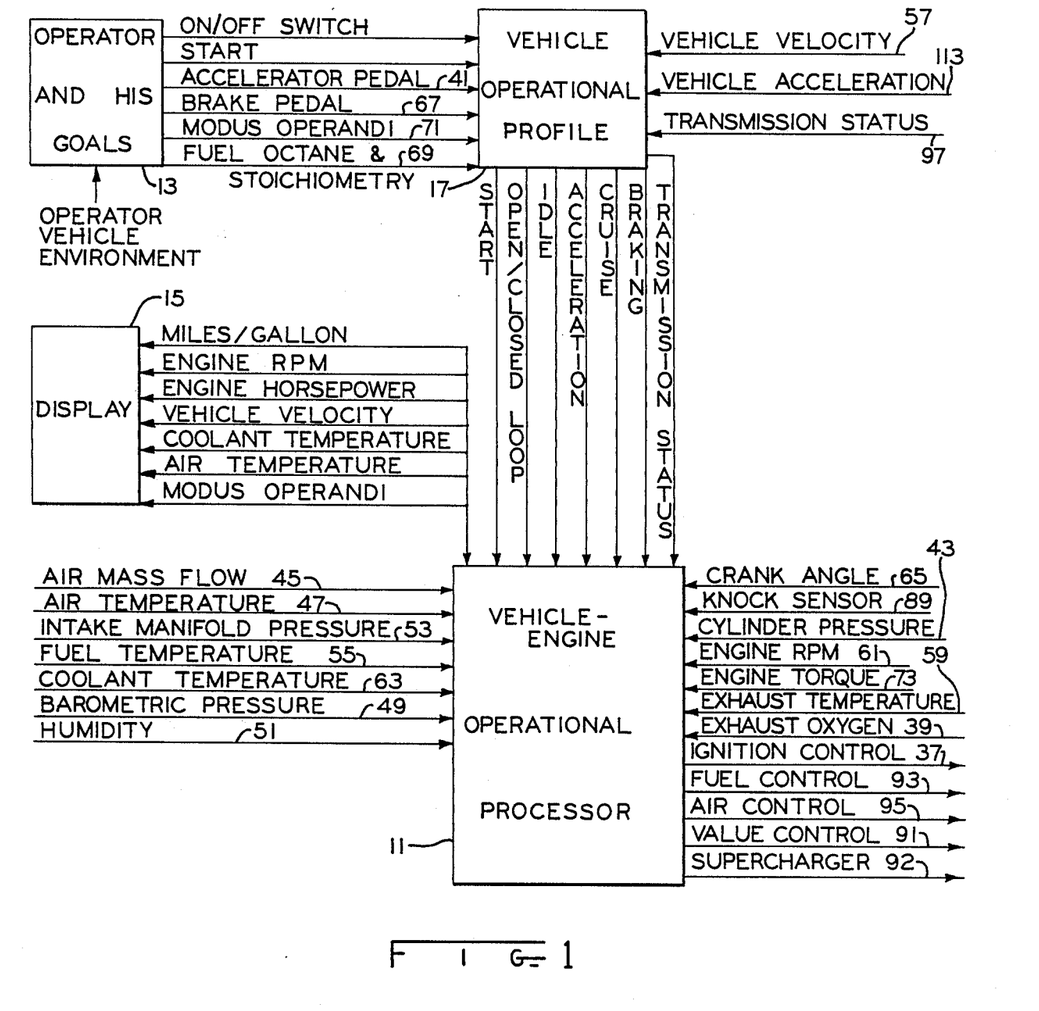
FIG. 1 is a over-all schematic diagram of a vehicle management computer illustrating the present invention in one form and illustrating a possible set of performance indicators.
Figure 2:
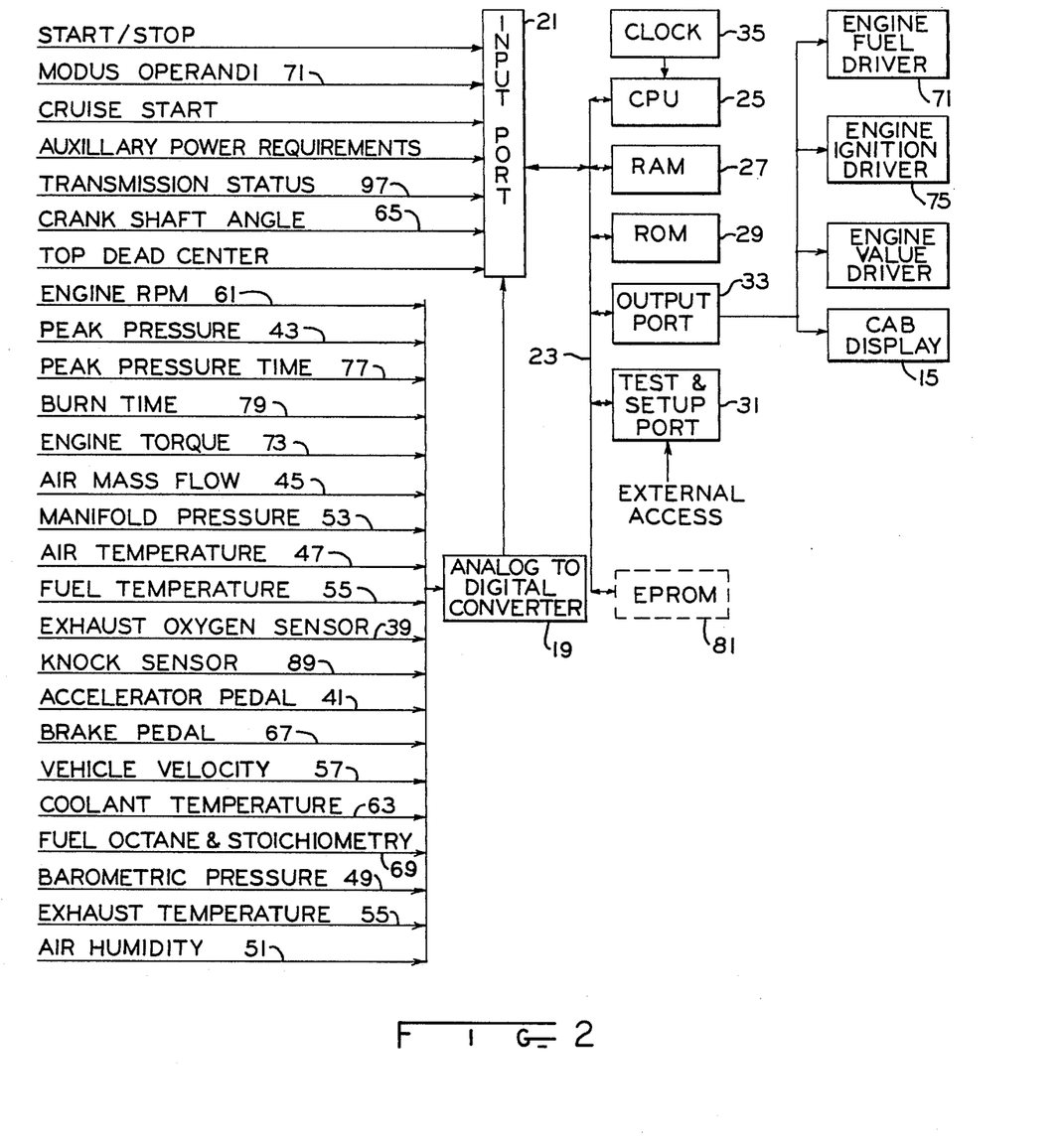
FIG. 2 is a more detailed schematic diagram of the vehicle engine operational processor of FIG. 1.

Referring more particularly to FIG. 1, the heart of the vehicle management computer is the vehicle-engine operational processor 11, itself shown in greater detail in FIG. 2. The processor 11 receives environmental conditions, such as barometric pressure 49; vehicle performance indicators, such as vehicle velocity 57; operator inputs 13, such as accelerator pedal positon 41; and engine performance indicators, such as crank shaft angle 65 as inputs and provides a number of operating parameter outputs such as ignition timing control 37 as well as a display 15 of the current status of a number of the input indicators. The operator inputs and some of the vehicle performance indicators determine the vehicle operational profile 17. The system generally operates in an open loop fashion with closed loop operation being only occasionally used during times of near steady state operation as during cruise.

The several condition sensors employed in the present invention are per se known, generally analog devices. In FIG. 2, these inputs first pass through an analog to digital converter 19 which, in conjunction with input port 21 which may directly receive further digital inputs, functions to supply input information on a time sequenced basis to the main bus 23. Thus, each digital input indicator has its own unique time slot as defined by a central processing unit or CPU 25. Bus 23 provides two way communication between the central processing unit 25, a random access memory 27, a read-only memory 29 and a test and setup port 31 for external access to the system. Bus 23 also provides one-way communication by way of the output port 33 for controlling the engine parameters and providing the display 15 of FIG. 1. The function of the operational processor of FIG. 2 under steady state conditions is shown in greater detail in FIG. 3.

Figure 3:
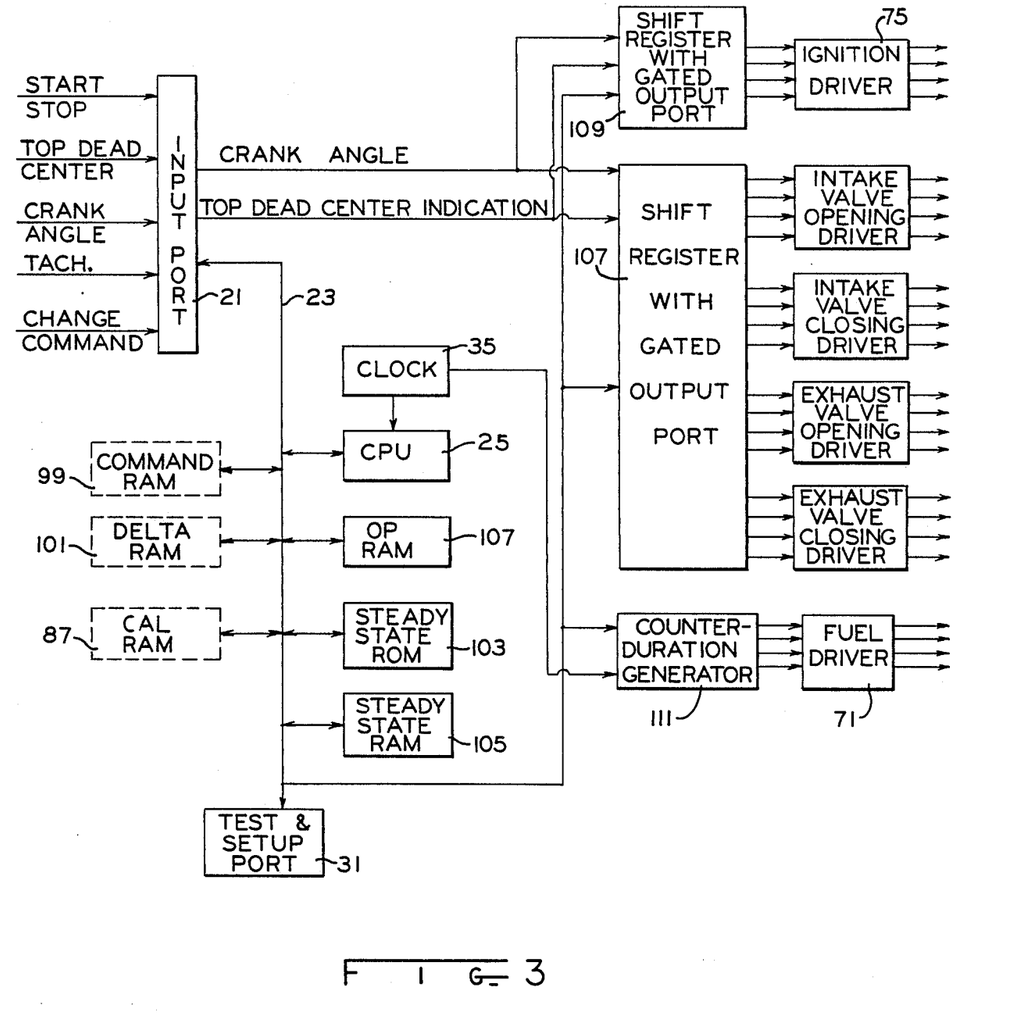
FIG. 3 is a more detailed schematic diagram of the valve control system of FIG. 2, and, in particular, the steady state operational profile.

In FIG. 3, a master clock 35 provides timing pulses to the central processing unit 25 which in turn synchronizes operation of the other components. Bi-directional communication between CPU 25 and steady state read only memory 103, steady state random access memory 105, operating random access memory 107, command random access memory 99, delta random access memory 101 and a calibration random access memory 87 is all by way of bus 23. It will be understood that while the several random access memories are depicted as separate, several or all may be portions of a larger memory shown generally as 27. Similarly, the steady state read only memory 103 and other read only memories to be discussed later may be separate memories or portions of a larger shared read only memory 29.

The steady state read only memory 103 stores a table or tables of engine operating parameters. The table or tables are determined for a particular make and model of vehicle, i.e., are factory determined. For given values of the input environmental conditions, operator inputs and performance indicators, a set of operating parameters is read from memory 103 and stored in steady state random access memory 105. The operating parameter values stored in memory 105 are modified as necessary in accordance with the information in the delta random access memory 101 and in the command random access memory 99 and the values as thus modified are stored in operating random access memory 107 for current engine control. Particular engine operating parameters are read from the operating memory 107 and sent to the output port 33 which may include shift registers 107 and 109 with gated outputs and a counter duration generator 111 for fuel injection and from there are used to appropriately actuate the pertaining driver such as ignition driver 75.

Regardless of the actual way in which the tabular data for a particular vehicle and engine is stored in memory 103, the information may be thought of as several independent n-dimensional vector spaces where each dimension corresponds to a particular performance indicator, operator input, or environmental condition, and the value of a vector in a particular space as determined by the values of each of its dimensions corresponds to a particular vehicle operating parameter. The information may also be thought of as a single n+1 dimensional vector space or array with the n dimensions again corresponding to the input information and the additional dimension serving to identify the particular operating parameter such as ignition time or intake valve opening time.

Cylinder to cylinder variations are one major problem in controlling emissions and maximizing economy. These are due to non-identical air and fuel ingestion, differences in compression ratio and other variations. If the approach to emission control is to run lean burn, the most lean cylinder may be operated near its lean burn limit close to misfire which would greatly increase emissions. To avoid misfire, the most lean cylinder would be run slightly more rich than its lean burn limit. Under these circumstances, depending on the variation between cylinders, the most richly operating cylinder may be too rich. Increasing the dimension of the vector space by one allows for storage of a plurality of different valve actuation time determining values and selection of the value for a particular valve best suited to the current operating traits. In this case, the current engine operating traits should include traits indigenous to individual ones of the engine cylinders, such as peak cylinder pressure 43. As an alternative, an offset or correction factor could be computed for each cylinder and applied to the value yielded by the table. Of course, the other cylinder parameters such as ignition timing may also be individually controlled.

It will be recognized that these tables can consume considerable space in the RAM 27 and ROM 29. Efficient utilization of memory may dictate that n be reduced, i.e., that some of the less important environmental or performance indicators be omitted. Memory may also be conserved by range encoding the particular inputs. For example, the values of the vector dimension corresponding to engine RPM could be the integers from one to 7 with one corresponding to the range from idle to 1200 RPM, two corresponding to 1200–1600 RPM, and successive integers assigned to each interval of 400 RPM up to seven which would indicate over 3200 RPM. Such range encoding of any of the inputs is a balancing of accuracy against memory space and speed of the table look-up operation.

The n inputs are not necessarily independent, that is, certain ones may be computed from others. Vehicle acceleration 113 of FIG. 1, for example, may be computed from timed repeated samplings of velocity 57 rather than directly measured. In some cases, this is dictated by the nature of the transducer used to sense the input condition. As one example, reasonably priced present day sensors for determining oxygen content in the exhaust (input line 39) are too slow acting for rapid changes in engine demand situations and therefore that input is not used in FIG. 4. These sensors are, however, adequate for long term updating of the system and therefore used in the long term "tuning" of the engine as in FIG. 5. Of course, for any particular engine-vehicle installation certain of the inputs may be omitted, while for other inputs, it may be important to sense not only the input value, but also its rate of change. As an example of the latter, one of the n inputs 41 is accelerator pedal position, but for rapid modification of the engine operating parameters, it may be desirable to know not only that the operator has depressed the pedal, but also that it was depressed rapidly (the first derivative of pedal position) as in emergency pasing of another vehicle. It may also be desirable to know that the pedal was depressed rapidly initially and then more slowly later on (the second derivative of pedal position with respect to time). The particular inputs used represent a trade off between ideal vehicle management and available memory space along with other economic considerations.

Figure 4:
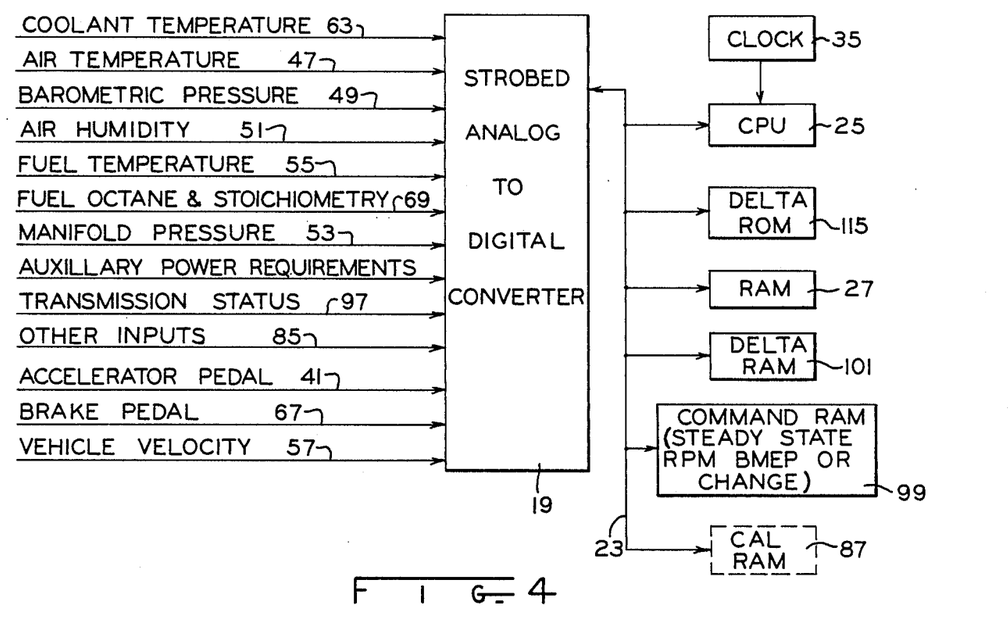
FIG. 4 is a more detailed schematic diagram of the valve control system of FIG. 2, and, in particular, the corrective (command and delta) operational profile.

FIG. 4 shows the sources of corrective measures to be placed in the delta random access memory 101 to modify the fuel, ignition and valve control information found in the steady state read only memory 103 and then stored in the operating random access memory 107. The instructions in the read only memory 115 are for a given RPM, and effective torque produced by the engine when operating at a given engine coolant temperature; inlet air temperature, barometric pressure and relative humidity; and other engine operating traits or conditions. When these conditions change, the information read from read only memory 115 is modified accordingly and stored in delta random access memory 101 and then transferred to the current operating information random access memory 107 and used for engine control. Such modifications are generally speaking to account for changes in the environment of the vehicle.

An indication of the indicated mean effective pressure and RPM 61 are used to control the required fuel and the derived ignition time. One approach is to measure air mass flow 45 directly, or to measure the barometric pressure 49, temperature 47 and intake manifold pressure 53 and then compute the indicated mean effective pressure (without combustion). In either case, corrections should be made taking the relative humidity 51 into consideration. In order to control the fuel driver 71, the fuel temperature 55 and fuel octane 69 should be considered. Another approach is to measure engine shaft torque 73, and a still further approach is to set the air to fuel ratio based on the use of an oxygen sensor measuring the oxygen content 39 of the exhaust. Each of these approaches works well under steady state conditions, although each has its own limitations.

Under conditions of suddenly increasing loads, the already difficult to interpret pulsating intake manifold pressure 53 with its reversing flow pulses becomes even more difficult to filter and evaluate. This results in significant delays in determining the required spark (37) advance and determining the required fuel to control (111) the fuel to air ratio at the proper enriched operating point. If an air mass flow sensor 45 is used, the slow response time creates significant measurement and control problems. These inputs are useful for long term or slow updating of the tables, but for rapid response, if the engine torque 73 and RPM 61 are known, then the position, change in position, rate of change of position and the acceleration of the rate of change of position of the accelerator pedal provides immediate useful information for transition operation. The transition response of the engine is also affected by the status of the transmission 97 and the kinetic energy of the vehicle which is proportional to the square of the velocity 57.

FIG. 2 illustrates a number of alternative vehicle traits and other input information which may be used in the control of the engine. The cylinder peak pressure 43, the time 77 at which that peak pressure occurs, and the burn time 79 may all be measured using a cylinder pressure sensor. Thus, while shown as three separate inputs 43, 77 and 79, the actual input may be from pressure sensors in one or more of the cylinders which are periodically sampled and the information computed therefrom. This same principle may be applied to other inputs such as the accelerator pedal position and its several derivatives discussed above. An ionization (flame conduction) sensor in a cylinder can also provide a measure of burn time 79, however, this measure is sometimes difficult to obtain under all engine operating conditions. Engine torque 73 can also be measured directly, however, this and cylinder pressure sensors are, at the present time, relatively expensive. Exhaust oxygen sensors 39 are commercially available and work relatively well, but they must be up to near steady state operating temperature before valid results are obtained. They have a slow time response and are also subject to ageing causing inaccurate indications. Exhaust gas temperature is quite useful as an indication of engine operating efficiency, but these and some of the other sensors possess relatively long time constants and are most useful in long term adjustment of the operating characteristics of the engine. To avoid these long time constant problems, the present system operates the engine based on the information in the steady state ROM 103 as updated (see FIG. 5) or calibrated in the calibration RAM 87. Immediate or short term changes in the engine operational requirements are effected primarily by the portion of the system depicted in FIG. 4.

The delta ROM 115 of FIG. 4 is a factory set map of appropriate responses to operator indicated changes such as depression of the accelerator or brake pedal for given current operating conditions. It may, of course, be a portion of the general ROM 29 of FIG. 2. This map or table is transferred to and updated in delta RAM 101 which may be a portion of the general RAM 27 of FIG. 2 which provides the current operating information.

Part of the delta RAM information has to do with selection of certain vehicle negative accelerations where decisions are made to use less than the full complement of cylinders of the engine for power. The cylinders not used are put into adiabatic no fuel operation. This condition is signaled by the operator backing off the accelerator pedal and/or, later, operation of the brake pedal progressively placing the engine into an energy absorbing air compressor mode. Removing pressure on the brake pedal and depression of the accelerator progressively puts the engine back into a power mode. When the same pattern of variations occurs during operation as it did during the original mapping, the delta RAM 101 corrections are applied to the steady state RAM 105. Again, RAM 105 may be a portion of the general RAM 27.

In addition to the brake 67 and accelerator 41 positions, the circuit of FIG. 4 is controlled by RPM and perhaps other measures supplied by the steady state circuit of FIG. 3 and stored in command RAM 99 and the other inputs illustrated in FIG. 4. As noted earlier, the several derivatives of pedal positions may be measured by periodic sampling of the inputs on lines 41 and 67.

A test and set-up port 31 is shown in FIGS. 2 and 3. This port allows data and command access to the main bus 23 so that operational tests may be performed and data can be entered into the EPROM 81 and in particular, the CAL EPROM 83 of FIG. 5.

Figure 5:
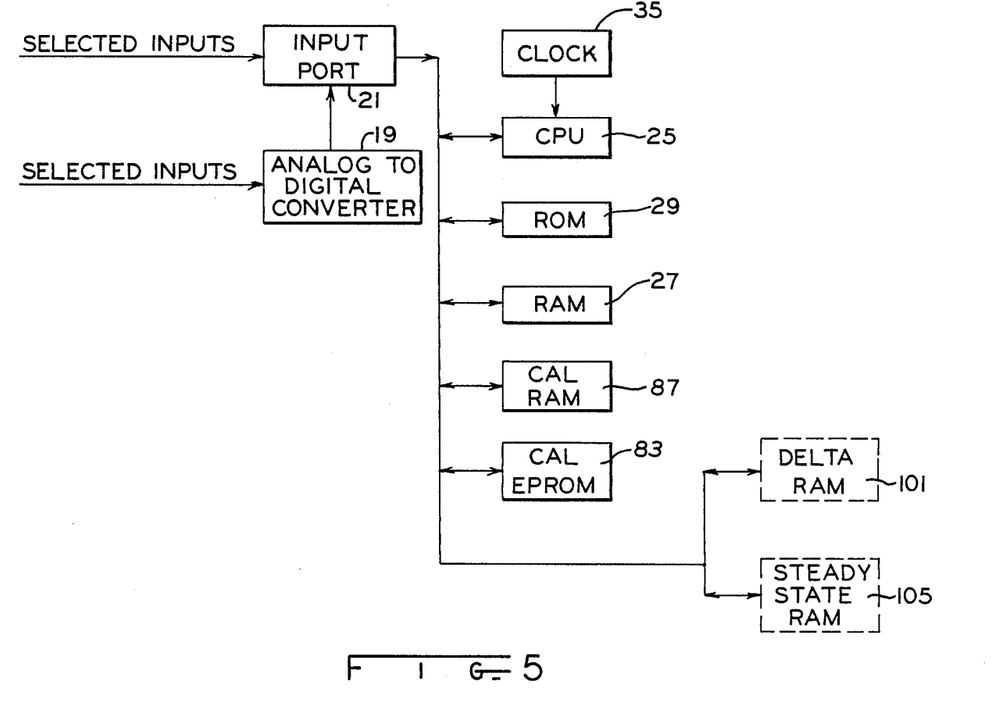
FIG. 5 is a more detailed schematic diagram of the valve control system of FIG. 2, and, in particular, the calibration operational profile.

The calibration computer of FIG. 5 obtains sensor data such as shown in FIG. 2 and, in the preferred realization, the data shown in FIGS. 3 and 4. The other data line 85 may include a variety of overall performance measures such as exhaust oxygen 39, exhaust gas temperature 59, knock sensing 89, flame rate, combustion chamber ionization measures, peak pressure time 77, or burn time 79. These measurements typically have long time constants or variations which require averaging either of which entails delay and causes difficulties in direct real time utilization of the measurements to control an engine. One problem has been that the desired vehicle dynamic responses are fast while the time responses of these sensors are slow and surging or oscillation has been very difficult to control. To avoid such problems, the approach of the present invention utilizes the calibration computer of FIG. 5 to classify various dynamic states, measure the mean responses of the delta and steady state controls, and to determine from over all performance data in EPROM 83 what recalibrations are necessary. These recalibrations are created slowly, stored in calibration RAM 87 and periodically transferred to the steady state operating RAM 107 to modify the control of the engine. Thus, the system slowly converges to an individual engine's optimum ignition timing, air to fuel ratio, and valve timing. In the main, however, valve control mapping will be relatively stationary in its profile depending on engine RPM and torque for a given engine. Aircraft applications, for example, might employ a different map to accommodate engine temperature excursions and altitude variations along with different performance demands during take-off, climb and cruise. Such engine operation optimization in response to a set of requirements in conjunction with other conditions can be used to optimize operation of an engine for a variety of applications such as trucking, boating and other mobile or fixed engine environments.

There are a number of ways that the approximately correct amount of fuel can be determined and added to the intake air of an automobile engine to generally get satisfactory drivability when the vehicle is under heavy acceleration, is operated under general driving conditions, or is operated in cruise conditions. The main problem is to get very good vehicle drivability or engine operation under all of the static and dynamic operating conditions and yet maximize economy and minimize emissions. The main root of the problem is in the long time constants in sensing the intake air mass flow rate so that the fuel can be properly adjusted. Instead of using a throttled manifold engine with variable air densities, sensing problems and pumping losses, an unthrottled variable valve engine can be used and the air consumed can be more rapidly and accurately determined.

The options and advantages of the vehicle management system are now feasible at least in part because of the reduced valve throttling losses, the reduced heating of the exhaust valve, the separate control of opening and closing times, and valve timing optimization to control as well as maximize engine output and efficiency. In the region of overlap of present valving systems there is an exchange of gas from the exhaust port to the intake manifold due in large measure to the low pressure of the intake manifold causing, in part, heating of the intake valve and affecting, among other things, fuel evaporation which contributes to deposit buildup on the intake valve. This affects engine respiration and can reduce volumetric efficiency. The present invention times and controls rapidly operating, low throttling valves so that valve overlap may be less often used greatly improving this situation. When overlap is not used, fuel enrichment can be eliminated. Rapid valve operation will give rise to reduced pumping losses, increased volumetric efficiency, and allow for controlling the expansion ratio of the engine power stroke. In particular, instead of controlling the engine by throttling the intake manifold thereby operating the engine in a vacuum pump or variable intake density mode, the engine, and in particular the cylinder charge, may be controlled by governing the duration of time the intake valve is open followed by an adiabatic expansion and compression, or by controlling the net time during the cycle that the intake valve is open as opposed to throttling the intake to the engine.

Opening the intake valve at a controlled time (dependent on patterns of vehicle performance and other indicators) such as in the order of 10 to 70 degrees after top dead center and closing at the appropriate time increases volumetric efficiency and prevents mixing of exhaust and intake gases which mixing is characteristic of conventionally valved engines during the traditional valve overlap periods.

Closing the intake valve at a precise point in the cycle will increase low engine speed torque by stopping the reverse flow of the intake mixture back into the intake manifold which occurs in conventionally valved engines at low RPM. Elimination of this exchange of gasses will have a highly desirable impact on operation of the engine such as allowing low speed operation of the engine with higher volumetric efficiency as well as greatly improving the starting and low temperature engine operation. The controlled sudden opening of the intake valve is advantageous in increasing and controlling turbulence and improving the mixing of fuel and air during the charging cycle. At low engine speeds, more turbulence is needed for fast burns whereas at higher engine RPM higher turbulence would only serve to increase heat losses, hence, the turbulence support should be varied. This turbulence concept is also applicable to Diesel engines especially during low speed, high torque operation where lack of proper burning created smoke and particulate pollution. High turbulence under these conditions greatly improves engine performance. More rapid opening of the exhaust valve will reduce the heretofore necessary lead time in starting exhaust blow down in the expansion stroke. The later opening of the exhaust valve extends the power stroke, reduces carbon monoxide and hydrocarbon emissions due to lessened quenching, and reduces pumping losses as well as lowering exhaust gas temperature. The rapid opening of the exhaust valve near bottom dead center also creates mass flow effects which yield recovered energy in the crank shaft by a subatmospheric exhaust gas venting stroke. Exhaust gas driven superchargers are known, but are ineffective at lower engine speeds. Such an exhaust gas driven supercharger may be used in conjunction with the present invention to provide low speed, high torque operation. For example, in the case of a combustion ignited internal combustion engine, a rapid opening and/or an early opening of the exhaust valve significantly enhances supercharger response at low speed operation. With either spark ignited or compression ignited internal combustion engines, the exhaust valve may be opened earlier at any engine speed to shorten the time required for intake air pressure boost from the exhaust gas operated supercharger. When rapid attack, low speed manifold boost along with late opening of the intake valve is used, cylinder turbulence can be increased to enhance clean burning under high fuel injection levels. The more rapid the opening and closing of the exhaust and intake valves, the higher the fluidynamic resonance Q factor, which will control and increase volumetric efficiency throughout the engine's operating range. Improvement in the volumetric efficiency of air compressors under variable operating circumstances is also possible with such intake and exhaust valve arrangements. The more rapid opening of the exhaust valve in the internal combustion engine, with less throttling and the reduction of the peak velocity of the boundary layer of the hot gasses past the valve will reduce heat transfer from the exhaust gases to the valve allowing the valve to run cooler, improving valve life particularly under highly oxidizing lean burn, high power and high temperature conditions. When used in conjunction with an exhaust gas driven supercharger, more exhaust gas energy can be recovered to increase supercharger output. The reduced exhaust gas quenching will reduce unburned hydrocarbon and carbon monoxide concentration in the exhaust.

The exhaust gases that are normally emitted near the end of the exhaust stroke are rich in unburned hydrocarbons due to scavenging effects of the unburned boundary layers close to the cooler combustion chanber walls and the boiling of unburned hydrocarbons out of cavities such as around the head gasket and around the piston and its compression rings that were deposited there due to pressurization of the charge due to the compression stroke and burning charge pressurization. Rapid closing of the exhaust valve will retain more of these emission rich gases for reburning and the control of exhaust valve opening that controls the expansion ratio of the engine will go toward greatly reducing or eliminating the need for the catalytic converter. The use of controlled exhaust gas retention can also eliminate the present exhaust gas recirculating devices.

Precise differential electronic control of the opening and closing times of the valves allows a control of the mass flow through the intake and exhaust valves in various operating modes with a resulting reduction of undesirable emissions, increase in volumetric efficiency and generally allows an optimization of engine performance. Differential control of ignition and fuel can allow all cylinders to be essentially identical thereby allowing a closer approach to the lean burn limit or to other critical points. Such precise electronic control can facilitate a number of further modifications including the fact that all cylinders may be purged with fresh air during shut down and that all valves may be closed when the engine is not in use, thereby eliminating exposure to the atmosphere and reducing corrosion within the combustion chambers due to residual gasses, condensates and oxides of nitrogen.

Initial cranking to start the engine may be performed with appropriate valves maintained open until cranking speed is sufficiently high. This provides a "compressionless" cranking to aid cold weather starting. Cold engine starting and running during the warm-up period without consuming excessive fuel is made possible by 6-cycle operation where one additional compression and expansion are used to vaporize the fuel. This approach will greatly assist in the use of low volatility (low Reed vapor pressure) fuels that are safer and provide less evaporation to the atmosphere. This 6-cycle mode of operation is described in greater detail in the abovementioned U.S. Pat. No. 4,878,464 . This facilitates cold engine starting with the present fuels and the future low volatility fuels and cold engine running as well as reducing unburned hydrocarbon emission prior to the time when a catalytic converter can be lighted. Such converters are ineffective until they reach an elevated operating temperature. Emission of unburned hydrocarbons from engine start-up and coming up to temperature will be greatly reduced. Leaving the cylinders of an up to temperature engine in appropriately charged states coupled with proper introduction of ignition spark, allows the engine to be restarted without cranking when the engine has been stopped for a short time period, such as sitting at a stop light.

Control of the number of cylinders in use, as during steady state cruse on a highway, or other low demand condition allows the active cylinders to be operated more efficiently because of the superior entropy due to higher burn pressures and temperatures that are required to get the demanded power level. Leaner burns can be used on the remaining cylinders due to the higher pressures and temperatures allowing higher ignitability and higher propensity of burning of the charge.

Reduction of unburned hydrocarbon emissions during deceleration is also possible. Conventionally valved engines develop high intake manifold vacuum during deceleration which enhances fuel evaporation on the manifold inner surface resulting in an overly rich mixture being burned. In particular, charging of the cylinders is controlled in the present invention by intake valve openings and closings and the intake manifold is not under variable vacuum and hence does not exhibit the same effects. Further, the overly rich low density cylinder charge in the conventional engine may not ignite or burn as completely as it does under higher charge levels, hence, causing high unburned hydrocarbon emissions. Engines equipped with the present electronically controllable valve arrangement may be used to aid normal or rapid deceleration by closing selected valves for operation using fewer than the full complement of cylinders or no powered cylinders allowing for vehicle slow down due to the rolling friction and aerodynamic losses under conditions where engine output is selectively less that the frictional losses, or cause the engine to absorb power in an air compressor mode.

When spark, fuel and valving are controlled, heat recovery by controlling air intake temperature is facilitated. For example, high heat recovery may be used when the combustion temperature is low as when operating the engine well below maximum torque. Such heat recovery may also help control combustibility under lean or high exhaust gas retention conditions. Ideally, the combustion temperature would be held to a predetermined maximum where one would have the best entropy position but yet controlled NOX production.

Reduced hydrocarbon emission results from higher expansion ratio, less quenching at the exhaust valve, reduced exhaust gas blow-down time, lower emission at the end of the exhaust stroke as well as during deceleration, and generally less valve overlap operation as well as lean burn and programming the engine to use fewer than the full complement of cylinders when possible. These combine to greatly reduce the need for catalytic converters. General improvement in efficiency may be achieved by increased and controllable expansion of the power stroke gases resulting, in part, from the very rapid opening of the present valve arrangement. The conventional exhaust valve may begin to open at 45 to 80 degrees before bottom dead center (for a 0.01 inch seat clearance) and at 60 or more psi gas pressure in order to achieve the momentum of the gas mass necessary to evacuate the exhaust gases against a great deal of exhaust gas valve port throttling. The valve of the present invention may be opened at near bottom dead center to utilize more of the expansion during the power stroke. The conventional engine exhaust valve may close 45 degrees after top dead center with the corresponding intake valve opening 20 to 40 degrees before top dead center resulting in perhaps 70 degrees of overlap where charge diluting exhaust is pulled into the intake manifold and then back into the cylinder resulting in charge heterogeneity and hence lean burn ignitability and burning problems. With the present invention, there is, in general, no such overlap between the intake and exhaust valves and hence there are less problems with developing heterogeneous charges and extending the lean burn limit.

The full control of the opening and closing of the valves of a reciprocating engine allows for a design that has a basic controllable high expansion ratio under normal operation and can effectively change that expansion ratio to allow for the same cylinder charge mass when the temperature of the charge varies. In order to take the greatest advantage of high expansion ratios, an engine of longer stroke for the same bore and end combustion chamber volume may be utilized, and/or complementary supercharging may be used. This makes it possible to recover heat from the exhaust making trade offs of higher efficiency due to lower entropy of the higher burn temperatures against the production of NOX due to these higher temperatures and the increased efficiency derived from higher expansion ratios. It should also be noted that a fast burn, long stroke, high speed engine with reduced maximum temperatures and dwell time at those temperatures reduces NOX emission.

Opening of the exhaust valve should usually occur when the pressure in the cylinder is nearly the same as the pressure in the exhaust port (generally atmospheric or crankcase pressure). Exhaust valve opening at other times reduces engine efficiency and increases undesirable emissions by purging unburned hydrocarbons from the cylinder. This near zero pressure differential exhaust valve opening time depends upon the current engine status.

The modes of operation shown in FIGS. 11 and 12 of the aforementioned copending application Ser. No. 153,257 as well as six-stroke cycle, two-stroke cycle, and operation as a conventional throttled engine are available under the computer control of the present invention. Those two modes may both take advantage of operation of the intake manifold at or near atmospheric pressure thereby significantly reducing the pumping losses associated with conventional throttled engines. FIG. 12, as opposed to FIG. 11 of that copending application, shows a technique which allows for lower valve opening and closing velocities. The power consumed by a valve mechanism is directly proportional to the square of the effective valve velocity or inversely proportional to the square of the valve transition time with appropriate allowance being made for acceleration and deceleration.

Valve operation in mode 1 as depicted in FIG. 11 of that copending application may be used at comparatively low speeds when the duration of valve operation (the time the valve remains open or closed) is sufficiently long compared to the time required to actuate or move the valve from one position to the other. At higher engine RPM, the engine may be switched over to mode 2. It will be noted that, in mode 1, the portion of the cycle during which the intake valve is open increases as engine speed increases while in mode 2, the portion of the cycle during which the intake valve is open decreases with increasing engine speed.

On starting, mode 2 has a highly desirable feature of treating the fuel to a more turbulent experience and, hence, is superior to mode 1 in evaporating and homogenizing the fuel in the air/fuel charge for cold starting. Cranking of the engine may also take place with the exhaust valve kept open and the intake valve kept closed (or with the exhaust valve kept closed and the intake valve kept open) to take advantage of engine momentum to help engine starting when the valves are suddenly properly sequenced. Such delayed valve operation starting may be in either mode 1 or mode 2 and may use delayed input valve opening to develop high velocity and turbulent air/fuel mixture flow with its associated improved evaporation and mixing of the air/fuel charge.

It is also possible to keep both intake and exhaust valves closed with ignition held in abeyance to allow a vehicle or load to motor an engine in an adiabatic way for conditions where no positive torque is required. For increased slow down (i.e., for absorbing shaft energy) where a variable negative torque is required, the nonfueled, nonignited engine can have the valves appropriately timed and be effectively used for braking.

Still referring to Copending application Ser. No. 153,257, the sooner the valve closes after bottom dead center, the greater will be the retained ingested charge into the engine and, hence, the greater the engine's torque. The primary difference in the two modes of operation is that there are operating circumstances, such as at high RPM and low torque, where the mode 1 operation requires a valve to close very soon after having opened. In mode 2, the period of time between opening and closing is always at least 180 degrees of crankshaft rotation as compared to perhaps as low as 30 degrees of crankshaft rotation in mode 1. Hence, mode 1 may require extremely fast opening and closing times. The increase in energy required to effect these rapid valve responses is disproportionately high. For example, to operate the valve 180/30=6 times as fast requires approximately the square or 36 times as much energy. Operating the valves in mode 2 requires far less energy and has other desirable characteristics.

In addition to modes 1 and 2 as set forth in the above copending application, the versatile control of the present invention allows further modes of operation including opening and closing the intake valve in synchronism with engine speed to operate the engine as a conventional throttled engine, or temporary operation as a two stroke cycle engine. Such a two stroke cycle mode of operation is known as "harmonic induction" with the exhaust valve opening slightly prior to bottom dead center and remaining open until slightly after bottom dead center whereupon the exhaust valve closes and the intake valve opens for a short period followed by closing of the intake valve and compression for the remainder of the cycle. The control also provides for a method of starting and accelerating a vehicle through a range of vehicle speeds during which the vehicle internal combustion engine is operated selectively in a plurality of different operating modes. According to the method, cranking of the engine may be accomplished in a compressionless mode preparatory to starting the engine, the engine may be run in a second mode at a relatively low speed for a warm-up interval as a six-stroke cycle engine where each engine cylinder cycle includes an essentially adiabatic compression and expansion. The higher volumetric efficiency with the valving opening and closing at top and bottom dead center along with the additional strokes allows cold starting with reduced vapor pressure fuels. Thereafter, the computer may effect a conversion to a third mode of operation as a four-stroke cycle engine during normal engine operation. This third mode may include modes 1 and 2 of the above described copending application. Increasing the engine speed and converting to operation in a fourth mode as a two-stroke cycle engine, or operation as a conventional throttled engine under high demand conditions is also possible.

The six-stroke cycle mode of operation has extra compression and expansion strokes after the intake and compression of a four-cycle mode. The purpose of this extra revolution of the crankshaft is to evaporate and more thoroughly mix the fuel and air so that cold start and run can take place without the presently used automatic choke or special extensive fuel enrichment. This leads to better cold starting and cold running without causing the extensive unburned hydrocarbon emissions of the present day engines which now occur prior to the time the catalytic converter comes up to temperature. When the engine warms up somewhat, conversion may be made to any of several four-stroke cycle modes. For example, the intake valve may be opened at a preferred time and the closing time controlled to thereby control the quantity of the ingested charge. This closing may take place prior to or slightly after bottom dead center (mode 1) or well after bottom dead center but prior to top dead center (mode 2).

Controlling the closing time of the exhaust valves may also be used to control the fuel/air mixture either separately or in conjunction with controlled intake valve opening and closing as in the previous examples. If the exhaust valve closes prior to top dead center, retained exhaust gas will be placed in an adiabatic compression and subsequent adiabatic expansion prior to the time the intake valve opens. The time at which the exhaust valve closes controls the volume of retained exhaust gas and therefore also controls the volume if ingested fuel and air when the intake valve opens as well as the retained heat in the cylinder. The capability to control retained heat can aid in lean burning. Lean burns burn slowly and to get the most useful burn at a given RPM the ignition should take place at an early time during the compression stroke. Successful ignition depends on the air/fuel mix and the density and temperature of the ignition plasma. Retained exhaust gas give a higher temperature and pressure for a given ignition time in the cycle with a higher probability of ignition and flame propagation through the surrounding gas. This can within certain limits greatly extend the lean burn limits and can be used to reduce emissions. Due to the earlier ignition and higher temperature of the cylinder gas before ignition, more thorough burning can take place which will reduce unburned hydrocarbon and carbon monoxide emissions. The lower energy yield of the cylinder gas reduces the maximum burn temperature which in turn reduces NOX emissions.

In the operation of a four cylinder engine, there is a companion cylinder operating 180 degrees of rotation behind a given cylinder so that the excess air/fuel gases that are expelled by the given cylinder in mode 2 are taken in by the companion cylinder. An engine using this mode of operation would likely have a single central injection or carburetion of fuel. This exchange of intake gasses within the intake manifold more thoroughly mixes and evaporates the fuel and the cold starting characteristics of the engine are much improved.

Another advantage of operating intake valves in mode 2 as compared to mode 1 is that finer control over the ingested charge is expected at all engine speeds. In mode 1, the minimum charge is controlled by the time to open plus the time to close the intake valve. When the engine is operating at a higher speed, this minimum time consumes greater crankshaft angular rotation and the minimum charge may not be as low as desired. The minimum charge is not controlled by the sum of these opening and closing times in mode 2 and mode 2 allows for a full range of control over all engine speeds.

In the conventional cam operated poppet valve, the points in the engine cycle at which opening and closing commences is fixed, but the actual time required for the valve to move between closed and open positions depends on engine speed. With the valve arrangement and control of the present invention, movement between closed and open positions is very rapid and independent of engine speed, and the point in the cycle where such opening or closing commences is selectable. These options allow for the selective operation in the various modes discussed above and those which follow.

Operating an internal combustion engine to control the turbulence of the gasses within at least one cylinder of the engine is possible by varying the time in the engine cycle at which an intake valve of the controlled cylinder is opened and, in particular, opening the intake valve earlier in the cycle at higher engine speeds and later in the cycle at lower engine speeds. By monitoring certain engine performance traits and correcting the time at which the intake valve is opened, the system can minimize particle emissions in the engine exhaust.

Operation of the valves of individual cylinders of an internal combustion engine over a range of engine speeds to optimize engine efficiency is possible by opening the exhaust valve of each cylinder during the cylinder's expansion stroke at a time when the pressure in the cylinder is near the pressure in its exhaust port. The valve is opened earlier in the stroke when the demand on the engine is low and later in the stroke when the demand on the engine is higher. The valves of individual cylinders of an internal combustion engine may be operated over a range of engine speeds to optimize engine efficiency by ensuring that the intake and exhaust valves of a common cylinder are not open at the same time while the engine is operating at lower speeds and opening the intake valve of each cylinder while the corresponding exhaust valve of that cylinder is still open at higher engine speeds. Higher and lower speeds as well as earlier and later in the stroke are relative terms with particular thresholds being desing considerations for particular engines. When starting the engine, each intake valve is opened when the piston of its cylinder is near top dead center and closed when that piston is near bottom dead center.

Control over one or more of the cylinders of a multiple piston internal combustion engine is accomplished by storing a plurality of different cylinder operation time determining values, monitoring a plurality of current engine operating traits including traits indigenous to individual ones of the engine cylinders, selecting the value for a particular cylinder best suited to the current operating traits, and controlling said particular cylinder at the time determined by the selected value. The time of ignition, fuel supply, and intake and exhaust valve opening and closing times for each cylinder may be controlled to optimize performance while minimizing undesirable exhaust emissions.

At least one of the vehicle internal combustion engine cylinders may be operated in a plurality of different operating modes to decelerate a vehicle through a range of vehicle speeds by removing fuel supply to the cylinder for modest deceleration, maintaining the cylinder valves closed to operate the cylinder in an adiabatic mode for medium deceleration, and opening and closing the cylinder valves to operate the cylinder in a nonadiabatic energy absorbing compressor mode for high deceleration.

Enhanced low engine speed operation of an exhaust gas actuated supercharger equipped engine may be achieved by opening the exhaust valves of the engine when the associated cylinder pressure is significantly above exhaust port pressure thereby releasing higher pressure exhaust gas to drive the supercharger.

The number of permutations of particular modes of operation for an engine are almost limitless. Furthermore, internal combustion engines have been described in the preferred embodiment, but almost any reciprocating piston device having at least one electronically controllable valve actuating mechanism is suitable for practicing the method of operating the electronically controlled valve actuating mechanism and the associated valve by storing a plurality of different valve actuation time determining values, monitoring a plurality of current device operating traits, selecting the value best suited to the current operating traits, and actuating the valve at the time determined by the selected value.

From the foregoing, it is now apparent that a novel arrangement for the overall management and control of a vehicle has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of operating an electronically controlled valve actuating mechanism and an associated valve on a reciprocating piston four stroke cycle internal combustion engine comprising the steps of storing a plurality of different valve actuation time determining values, monitoring a plurality of current engine operating traits, selecting the value best suited to the current operating traits, and actuating the valve at the time determined by the selected value, the step of selecting including selectively modifying the values based on engine operating experience.

2. The method of operating an electronically controlled valve actuating mechanism and an associated intake valve on a reciprocating piston four stroke cycle internal combustion engine selectively in a first mode at lower engine speeds, a second mode at higher engine speeds, and a third mode at near maximum engine speeds, the first mode including increasing the portion of the cycle during which the intake valve is open as the engine speed increases, the second mode including decreasing the portion of the cycle during which the intake valve is open as the engine speed increases, and the third mode including opening and closing the intake valve in synchronism with engine speed to operate the engine as a conventional throttled engine.

3. The method of starting and accelerating a vehicle through a range of vehicle speeds during which the vehicle internal combustion engine is operated in a plurality of different operating modes by selective timing of the same engine intake and exhaust valves comprising the steps of:

cranking the engine in a compressionless mode preparatory to starting the engine;

running the engine in a second mode at a relatively low speed for a warm-up interval as a six-stroke cycle engine where each engine cylinder cycle includes an essentially adiabatic compression and expansion;

converting to a third mode of operation as a four-stroke cycle engine during normal engine operation; and increasing the engine speed and converting to operation in a fourth mode as a two-stroke cycle engine under high demand conditions.

4. The method of operating a plurality of electronically controlled valve actuating mechanisms and a like plurality of associated valves on a multiple piston internal combustion engine comprising the steps of storing a plurality of different valve actuation time determining values, monitoring a plurality of current engine operating traits, selecting the value for a particular valve best suited to the current operating traits to control combustion chamber turbulence and burn rate thereby minimizing harmful engine emissions, and actuating said particular valve at the time determined by the selected value.

5. In a reciprocating piston device having at least one electronically controllable valve actuating mechanism, the method of operating the electronically controlled valve actuating mechanism and the associated valve comprising the steps of storing a plurality of different valve actuation time determining values, monitoring a plurality of current device operating traits, selecting the value best suited to the current operating traits to control combustion chamber turbulence and burn rate thereby allowing the use of lower octane fuels, and actuating the valve at the time determined by the selected value.

6. The method of providing enhanced low engine speed operation of an exhaust gas actuated supercharger equipped engine comprising opening the exhaust valves of the engine when the associated cylinder pressure is significantly above exhaust port pressure thereby releasing higher pressure exhaust gas to drive the supercharger.

7. The method of operating a plurality of electronically controlled valve actuating mechanisms and a like plurality of associated valves on a multiple piston internal combustion engine comprising the steps of storing a plurality of different valve actuation time determining values, monitoring a plurality of current engine operating traits including traits indigenous to individual ones of the engine cylinders, selecting the value for a particular valve best suited to the current operating traits, and actuating said particular valve at the time determined by the selected value.

8. The method of operating a plurality of cylinders of a multiple piston internal combustion engine comprising the steps of storing a plurality of different cylinder operation time determining values, monitoring a plurality of current engine operating traits including traits indigenous to individual ones of the engine cylinders, selecting the value for a particular cylinder best suited to the current operating traits, and controlling said particular cylinder at the time determined by the selected value.

9. The method of claim 8 wherein the time of ignition, fuel supply, and intake and exhaust valve opening and closing times for each cylinder are controlled to optimize performance while minimizing undesirable exhaust emissions.

10. The method of operating electronically controlled valve actuating mechanisms and their associated intake and exhaust valves of a common piston on a reciprocating piston four stroke cycle internal combustion engine comprising selectively opening and closing both the intake and exhaust valves once during each complete piston reciprocation thereby operating the engine as a two-stroke cycle engine utilizing the same intake and exhaust valves as operated during four-stroke cycle operation only when the engine speed is above a predetermined value.

11. The method of claim 10 wherein the engine normally operates in a four stroke cycle mode and is converted to a two stroke cycle mode only when high output torque is required at an engine speed above the predetermined value.

12. The method of claim 10 further comprising the further step of selectively maintaining both the intake and exhaust valves closed during a complete piston stroke from top dead center to bottom dead center during a portion of the engine cycle only when the engine speed is below a second predetermined value which is in turn less than said predetermined value.

13. The method of claim 12 wherein the engine normally operates in a four stroke cycle mode, is converted to a two stroke cycle mode only when high output torque is required at an engine speed above the predetermined value and is converted to a six stroke cycle mode when the valves are maintained closed throughout the piston stroke only during periods of engine starting and warm-up.

* * * * *